Sept. 3, 1968   A. R. TAYLOR   3,399,728
CONDUIT CLOSURE APPARATUS
Filed Dec. 1, 1966   4 Sheets-Sheet 2

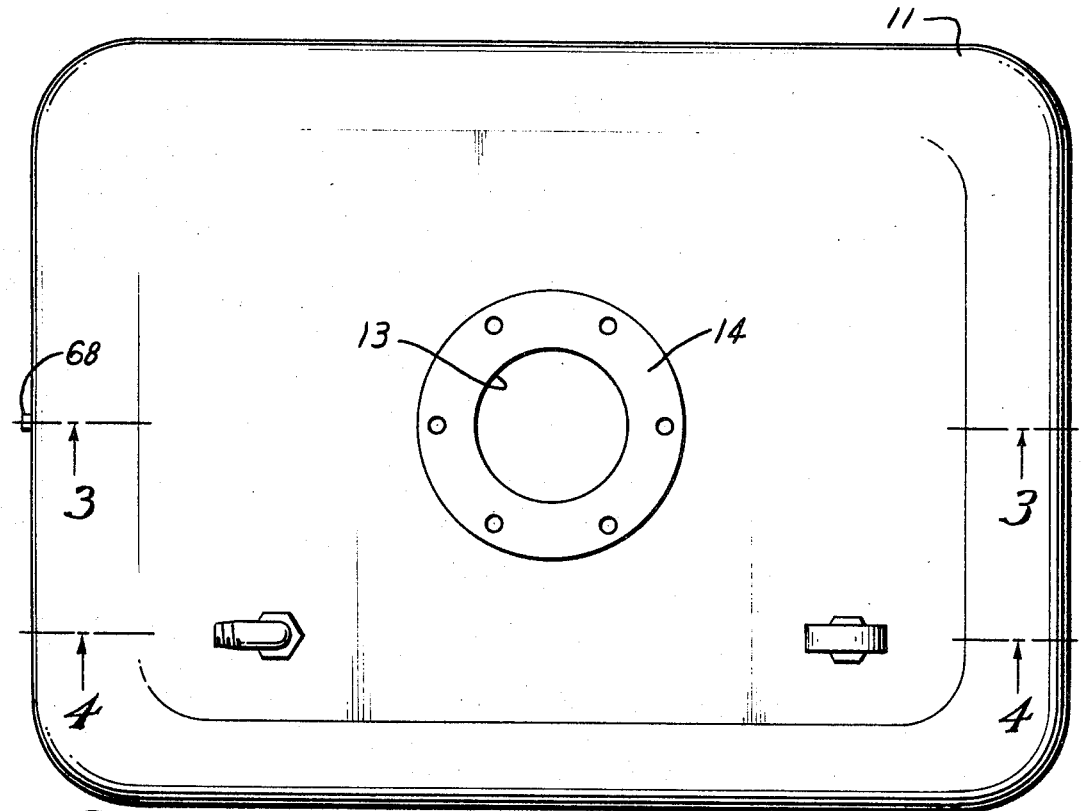
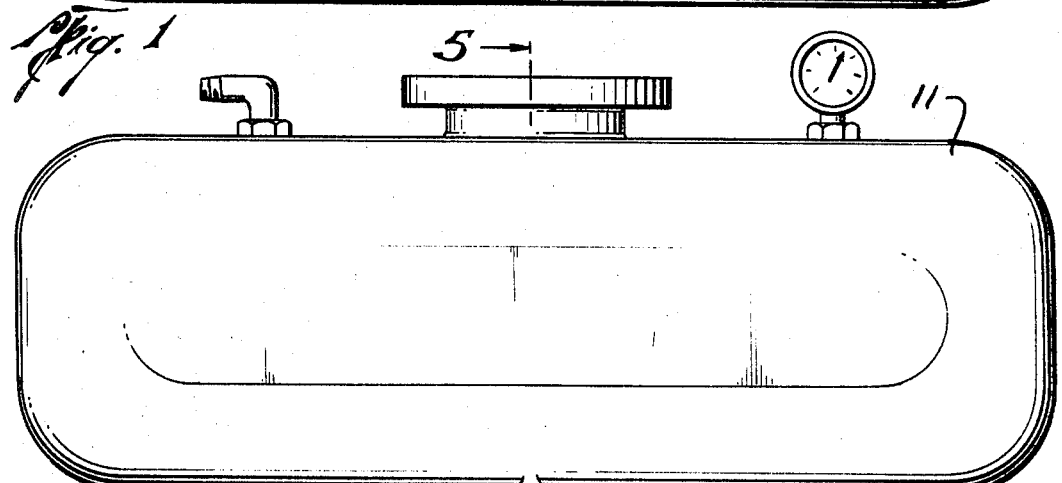
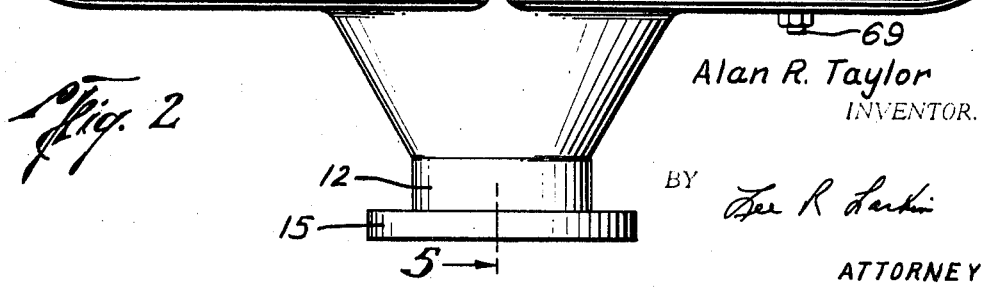

Alan R. Taylor
INVENTOR.

BY Lee R. Larkin
ATTORNEY

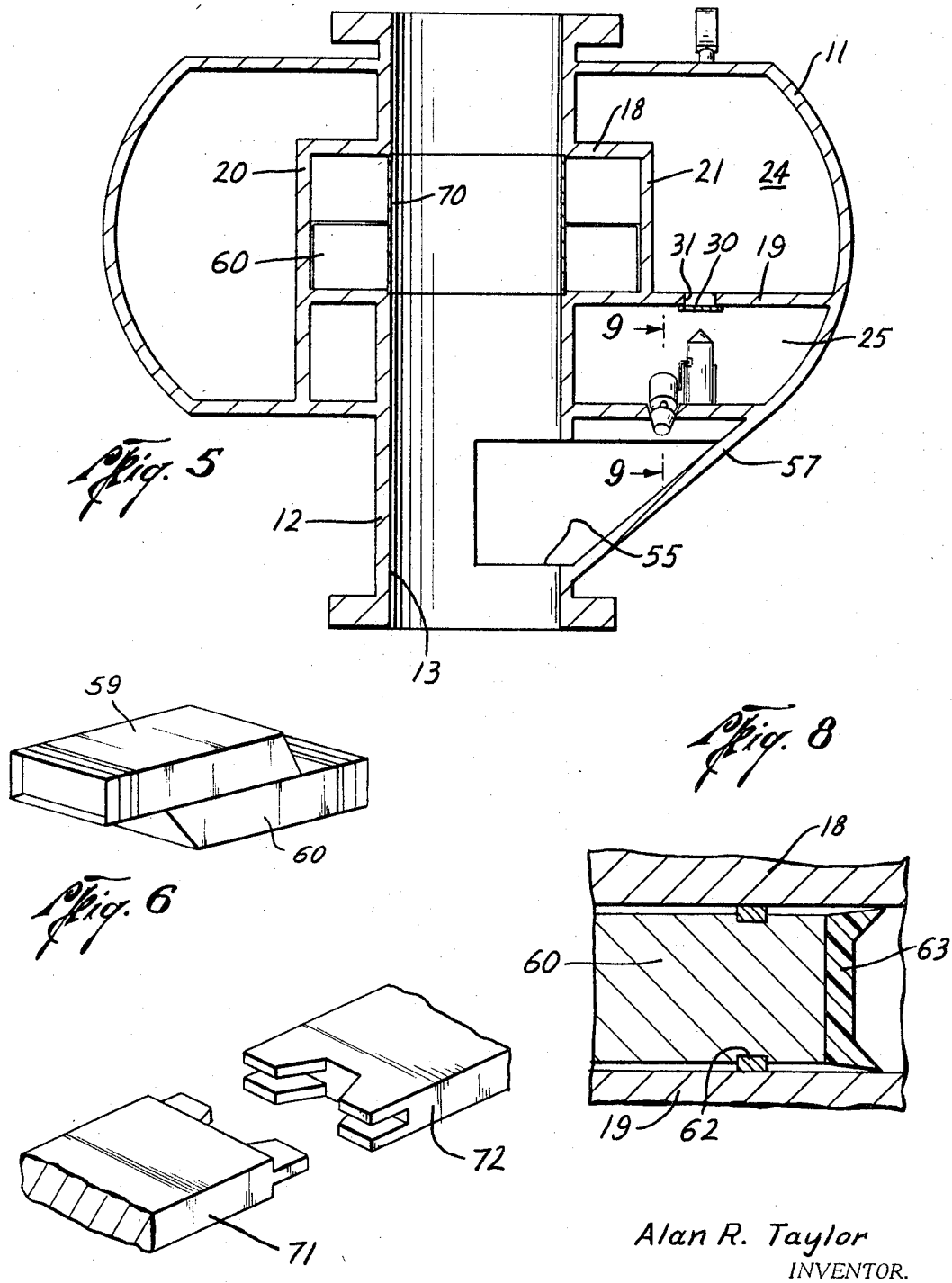

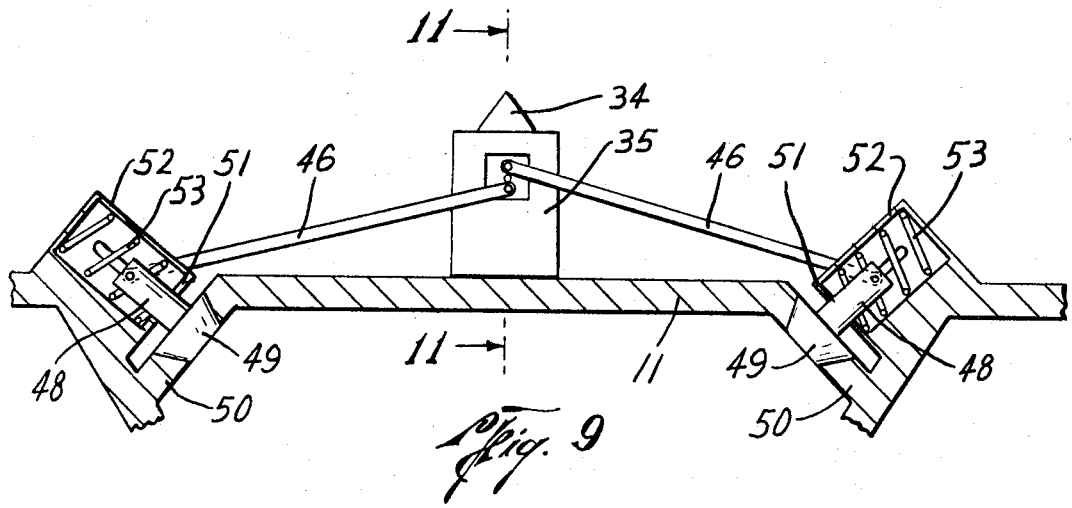
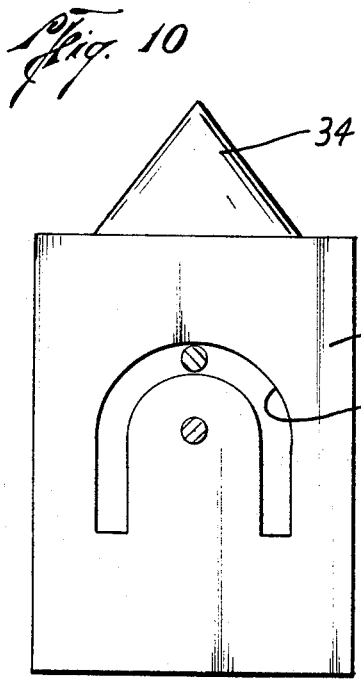
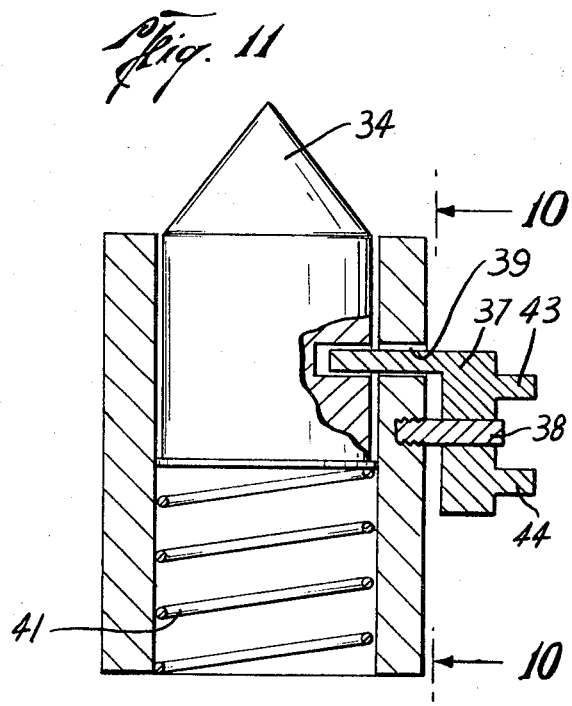

United States Patent Office 3,399,728
Patented Sept. 3, 1968

3,399,728
CONDUIT CLOSURE APPARATUS
Allan R. Taylor, 1700 Mustang Trail, Rte. 3,
Humble, Tex. 77338
Filed Dec. 1, 1966, Ser. No. 598,399
13 Claims. (Cl. 166—53)

ABSTRACT OF THE DISCLOSURE

An apparatus for automatically closing off fluid flow through a conduit, such as an oil well casing, in response to a change in fluid pressure in the conduit. It includes a body member connected to the conduit and having a chamber for receiving and storing a supply of pressurized gas, such as air. Means are provided for applying the pressure of this supply of gas to operate closure means to thereby close off fluid flow through the conduit. In the oil industry, the apparatus may be termed an "Automatic Blow-out Preventor" or "Auxiliary Blow-out Preventor."

---

This invention relates to a conduit closure apparatus. More particularly, this invention relates to an apparatus which is adapted to automatically close off flow through a fluid conduit, such as an oil well casing, in response to a change in fluid pressure in the conduit beyond a predetermined limit. The apparatus is particularly useful as an automatic oil well blow-out preventor, or auxiliary blow-out preventor.

There has long been need for an apparatus of this type for controlling fluid flow through a conduit as, for example, to automatically prevent blow-outs. Many prior devices have been developed in attempts to solve this problem. Most of the prior devices are generally hydraulically operated and normally rely for activation upon a remote source of high pressure hydraulic fluid. However, the hydraulic lines leading from the source of hydraulic fluid often leak, causing loss of fluid. Moreover, in offshore installations, for example, it quite often develops that personnel must for some reason be removed from the immediate environment of the oil well. The result is that no personnel are present to observe any increase in pressure and to close the blow-out preventor before blow-out occurs. Further, it often happens that high seas will dislodge the drilling platform which normally supports the pump means which supplies the hydraulic fluid. In such instances, the well is unattended and may easily blow-out during such times, particularly since no personnel are present to monitor any increase in the fluid pressure which would be a prelude to such a blow-out.

It is therefore an object of this invention to provide an improved automatic conduit closure apparatus such as a blow-out preventor, which will overcome the foregoing problems.

Briefly stated, the apparatus of this invention includes an enclosed body member having means for connection to a fluid conduit and having partition means for dividing the body member into first and second chambers. The first chamber is adapted to receive and contain a supply of pressurized gas such as air. Seal means are mounted in the partition means dividing the body member into first and second chambers, which seal means normally prevent fluid communication between the two chambers and which seal means are adapted to permit fluid communication therebetween at a predetermined time. In certain embodiments of this invention the seal means may be a fracturable member, as for example, a glass pane, or alternatively a valve means, which is adapted to open at the predetermined time.

Pressure responsive activation means are provided in the apparatus for placing the seal means in the fluid communicating condition in response to a change in pressure in the conduit beyond a predetermined limit. Conduit closure means are also mounted in the body member for closing fluid passages through the conduit in response to fluid pressure applied to the second chamber from the first chamber, the latter of which contains the supply of pressurized gas. The apparatus is normally mounted on the conduit, as for example, near the top end of a well casing, such that a change in pressure in the casing beyond a predetermined limit, as for example, an increase in pressure beyond a safe level, activates the activation means, which thereby places the seal means in the fluid communicating condition whereby the gas or fluid pressure in the first chamber is applied to the second chamber and thence to the closure means to close the conduit or casing.

In certain embodiments of the invention, the second chamber may be provided with a supply of liquid, such as oil or other type compatible liquid, whereby the air pressure is applied to the oil which transmits the pressure to the closure means. The body member may also be provided with an axial bore which may connect in the conduit through which the fluid flow is to be controlled.

In certain embodiments, the actuation means may include a striker which is adapted to strike and break the seal means, which may be in the form of a rupturable member, as for example, a glass pane. The striker may be actuated in response to a change of pressure in the conduit beyond a predetermined limit.

The closure means may include one or more ram pistons which is adapted for movement to the closing position by the application of fluid pressure to one end thereof, which fluid pressure is applied upon actuation of the activation means.

Reference to the drawings will further explain the invention, wherein like numerals refer to like parts and in which:

FIG. 1 is a top plan view of an apparatus of one embodiment of the invention.

FIG. 2 is a side elevation view of the apparatus shown in FIG. 1.

FIG. 5 is a central sectional view taken at line 5—5 of FIG. 2.

FIG. 6 is an isometric of the closure means shown in FIGS. 1–5.

FIG. 7 is an isometric view of alternate closure means.

FIG. 8 is an enlarged sectional view of the rearward portion of the closure means shown in FIG. 6.

FIG. 9 is an enlarged view of the activation means taken at line 9—9 of FIG. 5.

FIG. 10 is an enlarged side elevation view of the striker means shown in FIG. 9, and taken along line 10—10 of FIG. 11.

FIG. 11 is a generally central sectional view of the striker means taken along line 11—11 of FIG. 9.

Figure 3:
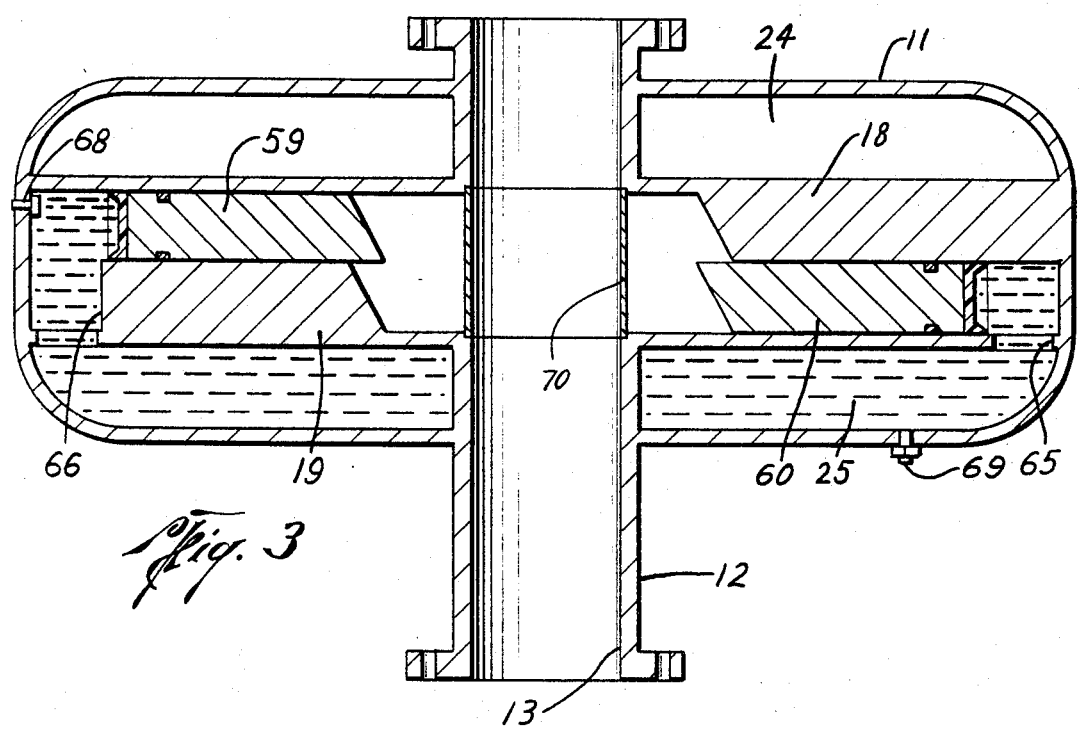
FIG. 3 is a central sectional view taken at line 3—3 of FIG. 1.

Referring now to the drawings generally and FIGS. 1–5 in particular, one embodiment of this invention will be described in detail. The apparatus is comprised of an enclosed body member having means for connection to a fluid conduit and having partition means for dividing said body member into first and second chambers, said first chamber being adapted to contain a supply of pressurized gas. This body member is conveniently shown in the form of casing 11, which is generally rectangular in plan view and has passing axially therethrough central tube 12, thereby forming axial bore 13 through casing 11. Tube 12 is provided with top flange 14 and bottom flange 15 for connection to adjoining pieces of the conduit which, for example, may be the casing of an oil well.

Figure 4:
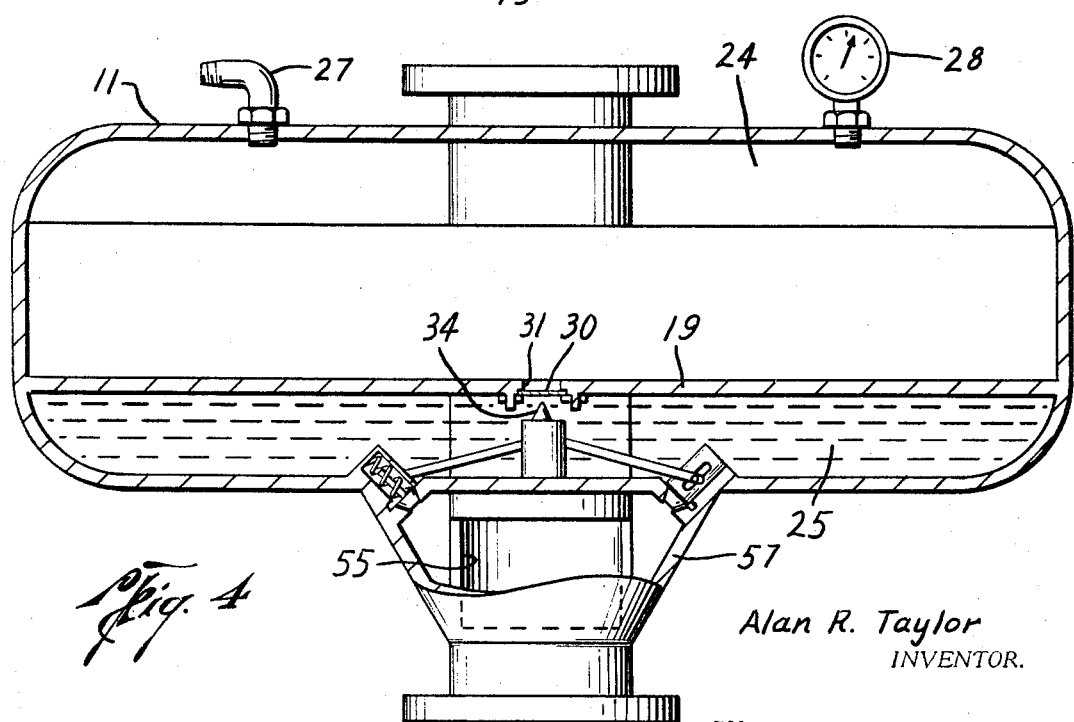
FIG. 4 is a sectional view taken at line 4—4 of FIG. 1.

Partition means are provided for dividing casing 11 into first and second chambers and are shown in the form of upper partition wall 18, lower partition wall 19 and side walls 20 and 21, as best seen in FIGS. 3, 4, and 5.

There it will be observed that walls 18 and 19 are vertically spaced apart and are in generally horizontal planes, whereas side walls 20 and 21 are horizontally spaced apart and are in general vertical planes. Thus, there is formed a first chamber in the form of gas chamber 24, which is generally above lower partition wall 19 and a second chamber in the form of chamber 25, which is generally below partition wall 19. It is to be understood that upper chamber 24 is adapted to receive and contain a supply of pressurized gas, as for example, pressurized air, which can conveniently be supplied through high pressure air filler valve 27 communicating through the upper portion of casing 11, as shown in FIG. 4. Additionally, casing 11 has attached thereto and communicating with chamber 24, a pressure gage 28, which is arranged to provide a reading of the fluid pressure within chamber 24.

Seal means are provided in the apparatus for normally preventing fluid communication between chambers 24 and 25, and which seal means are adapted to permit fluid communication therebetween at a predetermined time. These seal means conveniently take the form of a rupturable divider member in the form of glass plate 30 mounted over aperture 31 in lower partition wall 19 as best seen in FIGS. 4 and 5. It is to be understood that glass plate 30 will be of the rupturable or fracturable type and is secured over aperture 31 by any convenient means to withstand pressures on the order of 15,000 to 20,000 p.s.i. in upper chamber 24. It is to be understood that other seal means might be used, as for example, valve closure means in the form of poppet valves might be used.

The apparatus also includes a pressure responsive activation means for placing the seal means in the fluid communicating condition between chambers 24 and 25 in response to a change in the pressure in the conduit being controlled, i.e. in axial bore 13. These activation means conveniently include a sharp pointed metal striker 34, normally retained in biased condition in striker sleeve 35 positioned proximate to and immediately below glass plate 30 as shown in FIG. 5.

FIGS. 9, 10, and 11 show striker 34 and sleeve 35 and related elements in greater detail.

Striker 34 is provided with a pointed upper end and is retained inside of sleeve 35 by means of L shaped retainer arm 37 connected for pivotal movement on sleeve 35 by means of pivot pin 38, with the leg portion of the retainer arm 37 projecting through inverted U shaped slot 39 provided in the wall of sleeve 35 and into a matching slot 40, provided in striker 34, as best shown in FIGS. 10 and 11. Striker 34 is normally biased upwardly by coil spring 41, with striker 34 being adapted for release upon pivotal movement of retainer arm 37 on pivot pin 38, such that the leg portion of retainer arm 37 is removed from engagement with striker 34. Upon such release, then striker 34 is forced upwardly by spring 41 to strike and rupture glass plate 30.

Retainer arm 37 has upper connector lug 43 and lower connector lug 44 attached to the rearward side thereof and spaced on opposite sides of pivot pin 38. Connector lugs 43 and 44 each have attached thereto a connector arm 46, the opposite ends of which are connected to a valve stem 48 of a pressure valve in the form of a poppet valve 49 which is adapted for seating in a valve seat provided in depending wall portion 50 at the bottom end of casing 11. Valve stems 48 each have connected thereabout a ring 51, which is adapted for sliding movement inside of a cylinder 52 which are connected to the internal portion of casing 11, as shown in FIG. 9 and are provided with bias means in the form of compression springs 53 therein, which spring normally exert a bias downwardly on rings 51 and hence causes valve 49 to seat in their respective valve seats. Wall portions 50 are inclined at an angle of approximately 45° with respect to the bottom portion of casing 11, whereby upward movement of either of the valves 49 and valve stems 48 will cause retainer arm 37 to be pivoted on pivot pin 38, thereby releasing striker 34. Valves 49 may be set to open at any predetermined pressure level, i.e. any predetermined pressure differential between the chamber 25 and the space immediately therebelow. This can be accomplished by varying the size of the spring 53 to thereby be responsive to the desired pressure differential.

The apparatus is so arranged that any change in fluid pressure inside of bore 13 is applied to valves 49, which arrangement is best shown by FIGS. 4 and 5. There, it will be observed that the lower end of tube 12 is provided with side aperture 55 through the wall thereof which communicates with the area formed inside of arcuate shaped wall portion 57 extending generally from tube 12 to the outside edge of casing 11 and extending approximately 180° around bore 13. Hence, any change in fluid pressure in bore 13 is applied to valves 49. When the pressure differential exceeds the compression force of springs 53, valves 49 are unseated thereby causing rotation of retainer arm 37 through connector arms 46, whereby striker 34 is released for movement against and rupturing of glass plate 30.

The apparatus also includes conduit closure means mounted in the body member for closing fluid passage through the conduit in response to fluid pressure applied to chamber 25 from chamber 24. These closure means conveniently take the form of a pair of piston rams shown as upper cutter ram 59 and lower cutter ram 60. Rams 59 and 60 are spaced on opposite sides of central tube 12 and are generally enclosed within upper partition wall 18, lower partition wall 19 and side walls 20 and 21, and are arranged for radially inward sliding movement therein.

Referring now to FIGS. 6 and 8, rams 59 and 60 are each generally rectangular in cross section and each is provided with a sharp cutting edge on the radially inward end thereof. FIG. 6 shows the rams as they would appear after having been moved to the closed position closing off bore 13.

FIG. 8 is an enlarged longitudinal central sectional view of the radially outward end of one of the rams shown in FIG. 6, as for example, ram 60. Seal means in the form of rectangular wall seal 62 is provided about ram 60 and the right end of ram 60, as viewed in FIG. 8, is also provided with a cup-shaped end seal 63. Upon application of fluid pressure to the radially outward end, i.e. the right end of ram 60 shown in FIG. 8, seal 63 is forced outwardly into sealing engagement with the wall forming the cylinder in which ram 60 operates.

Referring now to FIG. 3, the right end of lower partition wall 19, as viewed therein, is provided with cylinder opening 65, which communicates with chamber 25, whereby fluid pressure applied to chamber 25 is then applied to the rearward end of ram 60. Similarly, the left end of partition wall 19 is also provided with cylinder opening 66, which communicates with the rearward end of ram 59.

In the preferred embodiment, chamber 25 is filled with a liquid such as oil, which is compatible with the compressed gas contained in chamber 24. Means for supplying oil to chamber 24 take the form of fluid filler valve 68, positioned at the upward end of cylinder opening 66. Oil may be drained from chamber 25 by means of drain plug 69, mounted on the bottom of casing 11 and communicating with the lower portion of chamber 25.

Referring now to FIGS. 3 and 5 in particular, central tube 12 is provided with a collapsible sleeve 70 having a diameter which corresponds with bore 13. Sleeve 70 is designed to make bore 13 continuous and to seal off normal fluid pressure from the leading or radially inward ends of rams 59 and 60. Sleeve 70 may be of any collapsible material, or for example, a lead alloy which will have sufficient strength to retain normal fluid pressures in bore 13, but which can be readily sheared by rams 59 and 60 upon actuation thereof. Upon application of fluid pressure to the rearward ends thereof, rams 59 and 60 move radially inwardly until the leading edges thereof come to rest against the enlarged portions of partition walls 18 and 19, respectively. Hence, the closed position of rams 59 and 60 would be in the approximate position shown in FIG. 6, thereby effectively sealing off bore 13. Rams 59 and 60 are designed to shear through and/or crush any pipe supported in bore 13, whereby any fluid flow through bore 13 is effectively sealed off or closed.

FIG. 7 shows an alternate arrangement of the closure means which includes left crusher ram 71 and right crusher ram 72 which are generally similar in size and operation to rams 59 and 60. The leading edges of rams 70 and 71 are generally U shaped and adapted for mating engagement with each other. Rams 71 and 72 operate in the same manner that rams 59 and 60 operate and are designed to gather and crush any pipe that may be supported in bore 13 to thereby effectively seal off any fluid flow therethrough. The fluid pressure required to drive rams 71 and 72 to the closing position may be somewhat less than that required to actuate rams 59 and 60 to the closed position.

In operation of the tools described above, casing 11 is inserted near the top of the casing of an oil well, for example, by attaching top flange 14 and bottom flange 15 to adjacent sections of the pipe casing. Chamber 25 is preferably filled with oil through fluid filler valve 68. It is to be understood that in certain embodiments of the invention, chamber 65 may contain only a gas such as air under reduced pressure as compared with the gas pressure in chamber 24.

Chamber 24 would also contain a supply of high pressure gas, such as air, on the order of 15,000 to 20,000 p.s.i., which is supplied through high pressure air filler valve 27, which could thereafter be closed by any convenient means. The result is that chamber 24 would then contain a supply of pressurized fluid, which pressure would be shown by pressure gage 28. Chamber 24 would be effectively sealed off from chamber 25 by glass plate 30.

Coil springs 53 of the activation means are selected such that valves 49 open at a predetermined pressure, such as 5,000 p.s.i. in bore 13, which might occur in case of a blow-out. Upon this pressure level being attained, one or both of the valves 49 will be unseated thereby actuating connector arms 46, to move retainer arm 37 to the non-engaging position, thereby releasing striker 34 under pressure of coil spring 41, to thereby strike and rupture glass plate 30, thereby permitting fluid communication between chambers 24 and 25. Since chamber 25 is filled with oil, the fluid pressure in chamber 24 is immediately applied to the rearward ends of rams 59 and 60, thereby forcing them radially inward, shearing sleeve 70 and any pipe supported in bore 13, thereby effectively closing fluid flow through bore 13. Hence, a blow-out is immediately prevented upon pressure reaching the predetermined level, i.e. 5,000 p.s.i. in bore 13.

This invention provides a device which automatically operates to shut in a well at a predetermined time. It has a self-contained supply of fluid pressure, which is always available and which is not dependent upon a remote source. Hence, during times when the well is unattended, the device operates as a safety device without the need for supervisory personnel. Since the device is attached near the upper end of the well casing, it is not readily dislodged therefrom by rough weather or high seas. The device can be used as a supplementary device in addition to standard blow-out preventors or as the primary blow-out preventor.

Further modifications may be made within the scope of the invention. Accordingly, the foregoing description is to be construed as illustrative only and is not to be construed as a limitation upon the invention as defined in the following claims.

What is claimed is:

1. A conduit closure apparatus comprising:
   an enclosed body member having means for connection to a fluid conduit and having partition means for dividing said body member into first and second chambers, said first chamber being adapted to contain a supply of pressurized gas;
   seal means mounted in said partition means and normally preventing fluid communication between said first and second chambers and adapted to permit fluid communication therebetween at a predetermined time;
   pressure responsive activation means for placing said seal means in the fluid communicating condition in response to a change in pressure in said conduit beyond a predetermined limit;
   and conduit closure means mounted in said body member for closing fluid passage through said conduit in response to fluid pressure applied to said second chamber from said first chamber;
   whereby a change in pressure in said conduit beyond a predetermined limit activates said activation means, which thereby places said seal means in the fluid communicating condition, whereby fluid pressure in said first chamber is applied to said second chamber and then to said closure means to close said conduit.

2. The apparatus as claimed in claim 1 wherein:
   said second chamber is adapted to contain a supply of liquid.

3. The apparatus as claimed in claim 1 wherein:
   said body member is provided with an axial bore therethrough and including upper and lower connection means for connecting said axial bore in said conduit.

4. The apparatus as claimed in claim 1 wherein:
   said seal means is in the form of a rupturable divider member and said activation means includes a striker mounted in said body member proximate said divider member for breaking said divider member in response to said change of pressure in said conduit beyond a predetermined limit.

5. The apparatus as claimed in claim 1 wherein:
   said activation means includes valve means communicating with the interior of said conduit.

6. The apparatus as claimed in claim 1 wherein:
   said conduit closure means includes at least one ram piston which is adapted for movement to the closing position by the application of fluid pressure to one end thereof from said second chamber.

7. An oil well blow-out preventor for attaching to a well casing, comprising:
   an enclosed body member having an axial bore therethrough of a diameter generally corresponding with the diameter of said casing, means for connecting said body member to said casing in fluid communication with said axial bore, and said body member having partition means for dividing said body member into first and second chambers, said first chamber being adapted to receive and store a supply of pressurized gas;
   seal means mounted in said partition means and normally preventing fluid communication between said first and second chambers and adapted to permit fluid communication therebetween at a predetermined time;
   pressure responsive activation means for placing said seal means in the fluid communicating condition in response to an increase in pressure in said casing above a predetermined level;
   and casing closure means mounted in said body member for closing fluid passage through said casing in response to fluid pressure applied to said second chamber from said first chamber;
   whereby an increase in fluid pressure above said predetermined level in said casing activates said activation means, which thereby places said seal means in fluid communicating condition, whereby fluid pressure in said first chamber is applied to said second chamber and thence to said closure means; to shut in said well.

8. The apparatus as claimed in claim 7 wherein: said activation means includes valve means communicating with the interior of said casing.

9. The apparatus as claimed in claim 7 wherein: said casing closure means includes at least one ram piston which is adapted for movement to the closing position by application of fluid pressure to one end thereof from said second chamber.

10. The apparatus as claimed in claim 7 wherein: said casing closure means includes a pair of ram pistons mounted on opposite sides of said axial bore, each of which is adapted for radially inward movement to the closing position in response to fluid pressure applied to the radially outward ends thereof from said second chamber.

11. The apparatus as claimed in claim 10 wherein: said ram pistons are provided with cutting edges on the radially inward ends thereof, whereby any pipe supported in said casing will be sheared upon movement of said pistons to the closing position.

12. The apparatus as claimed in claim 10, wherein: said ram pistons are provided with generally U-shaped mating leading edges on the radially inward ends thereof, whereby any pipe supported in said casing will be crushed upon movement of said pistons to the closing position.

13. The apparatus as claimed in claim 8 wherein: said seal means is in the form of a rupturable divider member,
and said activation means additionally includes a striker mounted in said body member proximate said divider member for rupturing said divider member upon actuation thereof, and connection means connected between said valve means and said striker for activating said striker means upon actuation of said valve means;
whereby an increase in fluid pressure in said casing activates said valve means, which activates said striker means thereby rupturing said divider member, whereby fluid pressure in said first chamber is applied to said second chamber and thence to said casing closure means, to shut in said well.

References Cited
UNITED STATES PATENTS

| | | | |
|---|---|---|---|
| 1,875,673 | 9/1932 | Stockstill | 166—55 |
| 2,785,755 | 3/1957 | Dean | 166—224 |
| 2,998,070 | 8/1961 | Tamplen et al. | 166—224 |
| 3,223,114 | 12/1965 | Shafer | 251—57 |

JAMES A. LEPPINK, *Primary Examiner.*